United States Patent [19]

Newkirk et al.

[11] Patent Number: 4,923,832
[45] Date of Patent: May 8, 1990

[54] METHOD OF MAKING SHAPED CERAMIC COMPOSITES WITH THE USE OF A BARRIER

[75] Inventors: Marc S. Newkirk, Newark, Del.; Robert C. Kantner, Springfield, Pa.

[73] Assignee: Lanxide Technology Company, LP, Newark, Del.

[21] Appl. No.: 861,024

[22] Filed: May 8, 1986

[51] Int. Cl.$^5$ .............................................. C04B 35/00
[52] U.S. Cl. ........................................ 501/128; 501/87; 501/88; 501/96; 501/98; 501/119; 501/127; 501/102; 501/134; 264/65
[58] Field of Search ................ 501/87, 88, 92, 96, 501/98, 94, 119, 127, 128, 134, 89, 102; 423/345, 411, 412, 618; 75/235; 264/65

[56] References Cited

U.S. PATENT DOCUMENTS

| 1,362,237 | 12/1920 | Ros | 423/618 OR |
|---|---|---|---|
| 2,741,822 | 4/1956 | Udy | 25/157 |
| 3,108,887 | 10/1963 | Lonie | 501/98 X |
| 3,255,027 | 6/1966 | Talsma | 264/65 |
| 3,262,763 | 7/1966 | Bechtold | 501/98 X |
| 3,296,002 | 1/1967 | Hare | 501/80 |
| 3,298,842 | 1/1967 | Suefert | 501/127 |
| 3,419,404 | 12/1968 | Mao | 501/98 X |
| 3,421,863 | 1/1969 | Bawa | 501/128 |
| 3,437,468 | 4/1969 | LeSuefert | 75/235 |
| 3,473,938 | 10/1969 | Oberlin | 264/65 |
| 3,473,987 | 10/1969 | Sowards | 501/119 |
| 3,538,231 | 11/1970 | Newkirk | 373/117 |
| 3,551,101 | 12/1970 | Matsuo | 423/412 OR |
| 3,692,474 | 9/1972 | Arber | 423/411 X |
| 3,789,096 | 1/1974 | Church et al. | 264/60 |
| 3,864,154 | 2/1975 | Gazza et al. | 29/123 |
| 3,973,977 | 8/1976 | Wilson | 501/120 |
| 4,117,096 | 7/1978 | Hosaka et al. | 501/88 X |

FOREIGN PATENT DOCUMENTS

| 0116809 | 8/1984 | European Pat. Off. . |
| 0155831 | 9/1985 | European Pat. Off. . |
| 0127208 | 7/1985 | Japan | 423/412 |
| 1011527 | 4/1983 | U.S.S.R. | 423/618 |
| 0896766 | 5/1962 | United Kingdom | 423/412 |
| 2127709 | 4/1984 | United Kingdom | 423/412 |

OTHER PUBLICATIONS

Drouzy et al., "Oxidation of Molten Aluminum Alloys", Reaction With Refractories, France, vol. 29, No. 332, pp. 121-128, Mar. 1974.

Clavaud et al., "Refratories for Aluminum Alloy Melting Furnaces," Sep. 25 & 26, 1980.

Moskovits, "The Kinetics of Oxidation of Molten Aluminum in Oxidation Streams", Oxidation of Metals, vol. 5, No. 1 (1972).

Primary Examiner—William R. Dixon, Jr.
Assistant Examiner—Karl Group
Attorney, Agent, or Firm—Mark G. Mortenson; William E. McShane

[57] ABSTRACT

In the present invention, there is provided a method for producing a self-supporting ceramic or ceramic composite body by the oxidation of a parent metal to form a polycrystalline ceramic material comprising the oxidation reaction product of said parent metal with an oxidant, including a vapor-phase oxidant, and optionally one or more metallic constituents dispersed throughout the polycrystalline ceramic material. The method comprises the steps of providing at least a portion of said parent metal with a barrier means at least partially spaced from said parent metal for establishing at least one surface of the ceramic body, and heating said parent metal to a temperature above its melting point but below the melting point of the oxidation reaction product to form a body of molten metal. At that temperature, the molten metal is reacted with the oxidant, thus forming the oxidation reaction product. At least a portion of the oxidation reaction product is maintained in contact with and between the molten metal and oxidant to transport the molten metal through the oxidation reaction product toward the barrier means and into contact with fresh oxidant so that the oxidation reaction product continues to form at and interface between the oxidant and previously formed oxidation reaction product. The reaction is continued until the oxidation reaction product contacts the barrier means to produce a ceramic body having the surface established by the barrier means. A shaped ceramic composite is formed by superimposing a barrier means either a loose mass of filler material such as a preform to, and infiltrating the mass of filler or preform with the polycrystalline ceramic matrix, which grows until it contacts the barrier means.

49 Claims, 9 Drawing Sheets

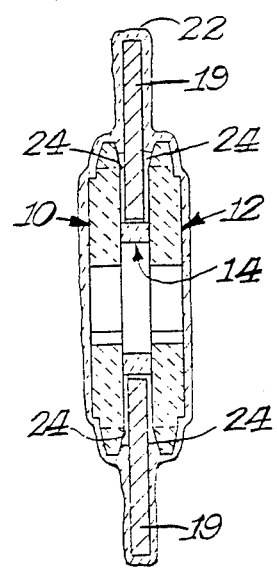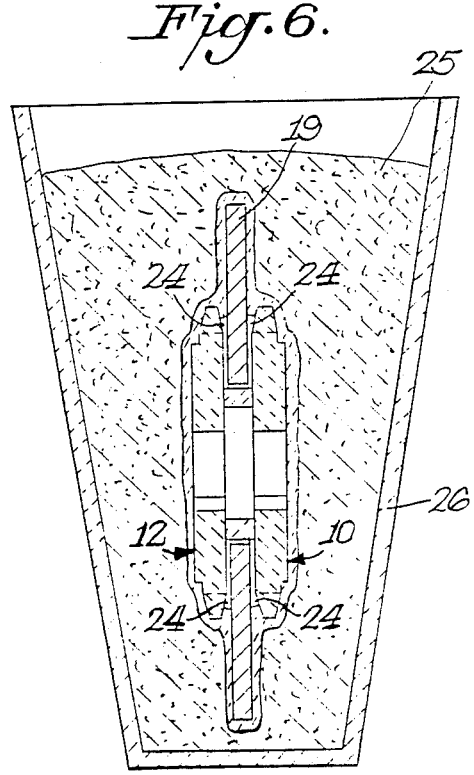

METHOD OF MAKING SHAPED CERAMIC COMPOSITES WITH THE USE OF A BARRIER

FIELD OF THE INVENTION

This invention broadly relates to methods for producing self-supporting ceramic bodies. More particularly, this invention relates to methods for producing shaped self-supporting ceramic bodies, including shaped ceramic composites, grown by the oxidation reaction of a precursor metal to a barrier means for establishing a surface, perimeter, boundary or the like in order to produce net shapes.

BACKGROUND OF THE INVENTION

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities when compared with metals, coupled with the fact that the engineering limits of performance of many modern components and systems are now gated by these properties in conventionally employed materials. Examples of areas for such prospective use include engine components, heat exchangers, cutting tools, bearings and wear surfaces, pumps, and marine hardware.

Current efforts at producing higher strength, more reliable, and tougher ceramic articles are largely focused upon (1) the development of improved processing methods for monolithic ceramics and (2) the development of ceramic matrix composites. A composite structure is one which comprises a heterogeneous material, body or article made of two or more different materials which are intimately combined in order to attain desired properties of the composite. For example two different materials may be intimately combined by embedding one in a matrix of the other. A ceramic matrix composite structure typically comprises a ceramic matrix which incorporates one or more diverse kinds of filler or preform materials such as particulates fibers, rods or the like.

There are several known limitations or difficulties in substituting ceramics for metals, such as scaling versatility, capability to produce complex shapes, satisfying the properties required for the end use application, and costs. Several copending patent applications and one patent assigned to the same owner as this application overcome these limitations or difficulties and provide novel methods for reliably producing ceramic materials, including composites. Thus, commonly owned U.S. Pat. No. 4,713,360 which issued on Dec. 15, 1987 and was based on U.S. application Ser. No. 818,943, filed Jan. 15, 1986, which was a continuation-in-part of application Ser. No. 776,964, filed Sept. 17, 1985, which was a continuation-in-part of application Ser. No. 705,787, filed Feb. 26, 1985, which was a continuation-in-part of application Ser. No. 591,392, filed Mar. 16, 1984, all in the names of Marc S. Newkirk et al and entitled NOVEL CERAMIC MATERIALS AND METHODS OF MAKING THE SAME, disclose generically the method of producing self-supporting ceramic bodies grown as the oxidation reaction product from a Parent metal precursor. Molten metal is reacted with a vapor-phase oxidant to form an oxidation reaction product, and the metal migrates through the oxidation product toward the oxidant and further oxidizes, thereby continuously developing a ceramic polycrystalline body. The process may be enhanced by the use of an alloyed dopant, such as is used in the case of oxidizing aluminum in air to form α-alumina ceramic structures. This method was improved upon by the application of dopant materials to the surface of the precursor metal, as disclosed in commonly owned U.S. application Ser. No. 822,999, filed Jan. 27, 1986, which is a continuation-in-part of Ser. No. 776,965, filed Sept. 17, 1985, which is a continuation-in-part of application Ser. No. 747,788, filed June 25, 1985, which is a continuation-in-part of application Ser. No. 632,636, filed July 20, 1984, entitled METHODS OF MAKING SELF-SUPPORTING CERAMIC MATERIALS, all in the names of Marc S. Newkirk et al.

This oxidation phenomenon was utilized in producing composite ceramic bodies as described in commonly owned and copending U.S. Pat. application Ser. No. 819,397, filed Jan. 17, 1986, which is a continuation-in-part of application Ser. No. 697,876, filed Feb. 4, 1985, both in the name of Marc S. Newkirk et al and both entitled COMPOSITE CERAMIC ARTICLES AND METHODS OF MAKING SAME. These applications disclose novel methods for producing a self-supporting ceramic composite by growing an oxidation reaction product from a parent metal precursor into a permeable mass of filler, thereby embedding the filler within a ceramic matrix. The resulting composite, however, has no defined or predetermined geometry, shape, or configuration.

A method for producing ceramic composite bodies having a predetermined geometry or shape is disclosed in the commonly owned and copending U.S. application Ser. No. 861,025, filed May 8, 1986, entitled SHAPED CERAMIC COMPOSITES AND METHODS OF MAKING THE SAME and in the names of Mark S. Newkirk et al. In accordance with the method of this invention, the developing oxidation reaction product infiltrates a permeable preform in the direction towards a defined surface boundary. Ceramic composites having a cavity with an interior geometry inversely replicating the shape of the original parent metal body are disclosed in commonly owned and copending U.S. application Ser. No. 823,542, filed Jan. 27, 1986, in the names of Mark S. Newkirk et al and entitled INVERSE SHAPE REPLICATION METHOD OF MAKING CERAMIC COMPOSITE ARTICLES AND ARTICLES OBTAINED THEREBY.

The entire disclosures of all of the foregoing commonly owned patent applications and Patent are expressly incorporated herein by reference.

A key element in using the methods of the above-mentioned commonly owned copending applications and Patent to produce net or near net shape ceramic body, including composite bodies which retain essentially the original shape and dimensions of the filler or preform, is to minimize or inhibit ceramic matrix overgrowth of defined surface boundaries. Overgrowth of the surface boundaries can be substantially prevented by controlling the infiltration of the polycrystalline ceramic matrix to any defined surface boundaries, which may be accomplished such as by using a predetermined quantity of parent metal, establishing within the preform favorable oxidation kinetics, exhausting the oxidizing atmosphere or lowering the reaction temperature. Any of these steps may require close control or vigilance to obtain essentially no polycrystalline overgrowth of any defined surface boundary, and still may not produce the most desirable net or near net shape, or may require additional machining or finishing.

The present invention provides means for reliably establishing a boundary or substantially preventing overgrowth of the developing oxidation reaction product which is desirable in forming net shapes particularly with larger, single-piece bodies or bodies with complicated geometry.

SUMMARY OF THE INVENTION

The present invention broadly provides a self-supporting ceramic body obtained by the oxidation reaction of a parent metal to form a polycrystalline material consisting essentially of the oxidation reaction product of the parent metal with one or more oxidants, including a vapor-phase oxidant and, optionally, one or more metallic constituents, having a surface boundary established by a barrier means. The vapor-phase oxidant may be used in conjunction with a solid oxidant or a liquid oxidant, as explained below in greater detail. A barrier means is used to establish a surface, perimeter, boundary or the like of the ceramic body.

The present invention further broadly provides a ceramic composite of a desired, predetermined shape. In accordance with this embodiment, a shaped mass of filler material having a surface boundary is superimposed with a barrier means to inhibit formation of the ceramic body therebeyond. Development or growth of the oxidation reaction product infiltrates the shaped mass and essentially terminates with the barrier means.

In accordance with the method of the present invention, the self-supporting ceramic body is produced by providing a barrier means at least partially spaced from the parent metal. The parent metal is heated to a temperature above its melting point but below the melting point of the oxidation reaction product to form a body of molten metal, and at this temperature or within this temperature range, the molten metal reacts with a vapor-phase oxidant to form the oxidation reaction product. It should be understood that the operable temperature range or preferred temperature may not extend over this entire temperature interval. At least a portion of the oxidation reaction product is maintained in contact with and between the molten metal and the oxidant, to draw molten metal through the polycrystalline material towards the barrier means and into contact with the oxidant such that the oxidation reaction product continues to form at the interface between the oxidant and previously formed oxidation reaction product, and optionally, leaving metallic constituents dispersed or distributed through the polycrystalline material. It should be understood that the polycrystalline material may exhibit porosity in place of some or all of the metal phase(s), but the volume percent of voids will depend largely on such conditions as temperature, time, and type of parent metal. The reaction is continued to produce the ceramic body grown to the surface or boundary established by the barrier means.

Most typically in forming a ceramic composite by the method of the present invention, the parent metal is positioned adjacent to and preferably in contact with a bed of filler material having a predetermined form or shape, e.g. a preform, such that the surface of the preshaped bed possessing a barrier means is situated outwardly, or away from, or spaced from, the parent metal. Formation and growth of the oxidation reaction product occurs in the bed in a direction towards the surface having the barrier means. The reaction is continued until the polycrystalline oxidation reaction product has infiltrated the preshaped mass to produce the ceramic composite having a configuration or geometry of the bed with the barrier means inhibiting or terminating growth thereby achieving a net or near net shape body.

The materials of this invention can exhibit substantially uniform properties throughout their cross-section to a thickness heretofore difficult to achieve by conventional processes for producing dense ceramic structures. The process which yields these materials also obviates the high costs associated with some conventional ceramic production methods, including fine, high purity, uniform powder preparation, hot pressing and hot isostatic pressing. The products of the present invention are adaptable or fabricated for use as articles of commerce which, as used herein, is intended to include, without limitation, industrial, structural and technical ceramic bodies for such applications where electrical, wear, thermal, structural, or other features or properties are important or beneficial; and is not intended to include recycle or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but, rather, refers to a body which is predominantly ceramic with respect to either composition or dominant properties, although the body may contain minor or substantial amounts of one or more metallic constituents derived from the parent metal or produced from the oxidant or a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of the reaction of one or more metals with an oxidant.

"Oxidant" means one or more suitable electron acceptors or electron sharers and may be an element, combination of elements, a compound, or combination of compounds including reducible compounds, and is a vapor, solid or liquid at the process conditions.

"Parent metal" refers to that metal, e.g. aluminum, which is the precursor for the polycrystalline oxidation reaction product, and includes that metal as a relatively pure metal, a commercially available metal with impurities and/or alloying constituents, or an alloy in which the metal precursor is the major constituent; and when a specified metal is mentioned as the parent metal, e.g. aluminum, the metal identified should be read with this definition in mind unless indicated otherwise by the context.

BRIEF DESCRIPTION OF THE DRAWINGS

FIG. 5 is a cross-sectional view on line 5—5 of FIG. 4 coated by a barrier in accordance with Example 1.

FIG. 6 is a cross-sectional view of the coated assembly of FIG. 5 placed in an inert bed contained in a refractory vessel.

DETAILED DESCRIPTION OF THE INVENTION AND PREFERRED EMBODIMENTS

Figure 1:
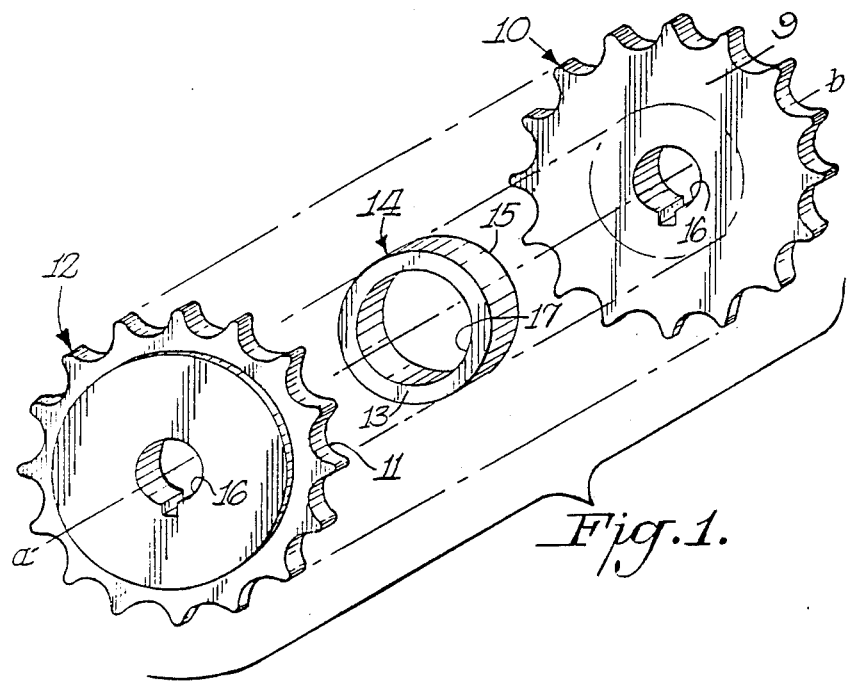
FIG. 1 is an exploded perspective view of the preform fabricated in accordance with Example 1.

In accordance with the present invention, the parent metal, which may be doped (as explained below in greater detail) and is the precursor to the oxidation reaction product, is formed into an ingot, billet, rod, plate, or the like, and placed in an inert bed, crucible or other refractory container. The parent metal is overlayed with a barrier means which is at least partially spaced from the parent metal. The barrier means establishes the surface, perimeter or boundary of the ceramic body in that growth or development of the oxidation reaction product is inhibited or terminated by the barrier means. The container, its contents, and the barrier means are subsequently placed in a furnace which is supplied with an oxidant including a vapor-phase oxidant. This setup is heated to temperatures below the melting point of the oxidation reaction product but above the melting point of the parent metal which, for example, in the case of aluminum using air as the vapor-phase oxidant, is generally between about 850°–1450° C. and more preferably between about 900°–1350° C. Within this operable temperature interval or range, a body or pool of molten metal forms, and on contact with the oxidant, the molten metal will react to form a layer of oxidation reaction product. Upon continued exposure to the oxidizing environment, molten metal is progressively drawn into and through any previously formed oxidation reaction product in the direction of the oxidant and towards the barrier means. On contact with the oxidant, the molten metal will react to form additional oxidation reaction product and thus form a progressively thicker oxidation reaction product while, optionally, leaving metallic constituents dispersed through the polycrystalline material. The reaction of the molten metal with the oxidant is continued until the oxidation reaction product has grown to the barrier means which prevents or inhibits growth of the oxidation reaction product and produces the net or near net shape ceramic body. Thus, the barrier means of this invention inhibits or terminates growth of the polycrystalline material and assists in producing a well-defined, net or near net shaped ceramic body.

It should be understood that the resulting polycrystalline material may exhibit porosity which may be a partial or nearly complete replacement of the metal phase(s), but the volume percent of voids will depend largely on such conditions as temperature, time, type of parent metal, and dopant concentrations. Typically in these polycrystalline ceramic structures, the oxidation reaction product crystallites are interconnected in more than one dimension, preferably in three dimensions, and the metal may be at least partially interconnected. Because of the barrier means, the ceramic product has generally well-defined boundaries regardless of the metal volume content or porosity.

The barrier means of this invention may be any suitable means which interferes, inhibits, or terminates growth or development of the oxidation reaction product. Suitable barrier means may be any material, compound, element, composition, or the like, which, under the process conditions of this invention, maintains some integrity, is not volatile and preferably is permeable to the vapor-phase oxidant while being capable of locally inhibiting, poisoning, stopping, interfering with, preventing, or the like, continued growth of the oxidation reaction product.

It appears that one category of barrier means is that class of materials which is substantially non-wettable by the transported molten parent metal. A barrier of this type exhibits substantially little or no affinity for the molten metal, and growth is terminated or inhibited by the barrier means. Other barriers tend to react with the transported molten parent metal to inhibit further growth either by dissolving into and diluting the transported metal excessively or by forming solid reaction products, e.g. intermetallics, which obstruct the molten metal transport process. A barrier of this type may be a metal or metal alloy, including any suitable precursor thereto such as an oxide or a reducible metal compound, or a dense ceramic. Because of the nature of the growth inhibition or obstruction process with this type of barrier, growth may extend into or somewhat beyond the barrier before growth is terminated. Nevertheless, the barrier reduces any final machining or grinding that may be required of the product. As stated above, the barrier should preferably be permeable or porous, and therefore, when a solid, impermeable wall is used, the barrier should be opened in at least one zone or at one or both ends to permit the vapor-phase oxidant to contact the molten parent metal.

Suitable barriers particularly useful in this invention in the case of using aluminum parent metals are calcium sulfate, calcium silicate, and tricalcium phosphate, which are essentially non-wettable by the transported molten parent metal. Such barriers typically may be applied as a slurry or paste to the surfaces of a filler bed which preferably is preshaped as a preform. The barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20–1000. The alumina particulate may be mixed with the calcium sulfate, for example, in a ratio ranging from about 10:1 to 1:10, with the preferred ratio being about 1:1. In one preferred embodiment of the invention, the barrier means includes an admixture of calcium sulfate (i.e. Plaster of Paris) and portland cement. The portland cement may be mixed with the Plaster of Paris in a ratio of 10:1 to 1:10, with the preferred ratio of portland cement to Plaster of Paris being about 1:3. Where desired, portland cement may be used alone as the barrier material.

Another preferred embodiment, when using aluminum parent metals, comprises Plaster of Paris admixed with silica in a stoichiometric amount, but there can be an excess of Plaster of Paris. During processing, the Plaster of Paris and silica react to form calcium silicate, which results in a particularly beneficial barrier in that it is substantially free of fissures. In still another embodiment, the Plaster of Paris is admixed with about 25–40 weight percent calcium carbonate. On heating, the calcium carbonate decomposes emitting carbon dioxide, thereby enhancing the porosity of the barrier means.

Other particularly useful barriers for aluminum-based parent metal systems include ferrous materials, e.g. a stainless steel container, chromia and other refractory oxides, which may be employed as a superimposed wall or container to the filler bed, or as a layer to the surface of a filler bed. Additional barriers include dense, sintered or fused ceramics such as alumina. These barriers are usually impermeable, and therefore are either specially fabricated to allow for porosity or require an open section such as an open end. The barrier means may form a friable product under the reaction conditions and can be removed as by abrading to recover the ceramic body.

The barrier means may be manufactured or produced in any suitable form, size, and shape, and preferably is permeable to the vapor-phase oxidant. The barrier means may be applied or utilized as a film, paste, slurry, pervious or impervious sheet or plate, or a reticulated or foraminous web such as a metal or ceramic screen or cloth, or a combination thereof. The barrier means also may comprise some filler and/or binder.

The size and shape of the barrier means depends on the desired shape for the ceramic product. By way of example only, if the barrier means is placed or situated at a predetermined distance from the parent metal, growth of the ceramic matrix would be locally terminated or inhibited where it encounters the barrier means. Generally, the shape of the ceramic product is the inverse of the shape of the barrier means. For example, if a concave barrier is at least partially spaced from a parent metal, the polycrystalline growth occurs within the volumetric space defined by the boundary of the concave barrier and the surface area of the parent metal. Growth terminates substantially at the concave barrier. After the barrier means is removed, a ceramic body remains having at least a convex portion defined by the concavity of the barrier means. It should be noted that with respect to a barrier means having porosity, there may be some polycrystalline material overgrowth through the interstices, although such overgrowth is severely limited or eliminated by the more effective barrier materials. In such a case, after the barrier means is removed from the grown polycrystalline ceramic body, any polycrystalline overgrowth may be removed from the ceramic body by grinding, grit blasting or the like, to produce the desired ceramic part with no remaining overgrowth of polycrystalline material. By way of a further illustration, a barrier means spaced from a parent metal, and having a cylindrical protuberance in the direction of the metal, will produce a ceramic body with a cylindrical recess inversely replicating the same diameter and depth of the cylindrical protuberance.

In order to achieve minimal or no polycrystalline material overgrowth in the formation of ceramic composites, the barrier means may be placed on, or positioned in close proximity to, the defined surface boundary of any filler bed or preform. Disposal of the barrier means on the defined surface boundary of the bed or preform may be performed by any suitable means, such as by layering the defined surface boundary with the barrier means. Such layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, growth of the polycrystalline oxidation reaction product terminates upon reaching the defined surface boundary of the preform and contacting the barrier means.

In a preferred embodiment of the present invention, a permeable shaped preform (described below in greater detail) is formed having at least one defined surface boundary with at least a portion of the defined surface boundary having, or superimposed with, the barrier means. It is understood that the term "preform" may include an assembly of separate preforms ultimately bonded into an integral composite, and explained below in greater detail. The preform is placed adjacent to and in contact with one or more parent metal surfaces or a portion of a surface of the parent metal such that at least a portion of the defined surface boundary having or superimposed with the barrier means is generally positioned distantly or outwardly from the metal surface, and formation of the oxidation reaction product will occur into the preform and in a direction towards the defined surface boundary with the barrier means. The permeable preform is part of the lay-up, and upon heating in a furnace, the parent metal and the preform are exposed to or enveloped by the vapor phase oxidant, which may be used in combination with a solid or a liquid oxidant. The reaction process is continued until the oxidation reaction product has infiltrated the preform and comes in contact with the defined surface boundary having, or superimposed with, the barrier means. Most typically, the boundaries of the preform, and of the polycrystalline matrix, substantially coincide; but individual constituents at the surfaces of the preform may be exposed or may protrude from the matrix, and therefore infiltration and embedment may not be complete in terms of completely surrounding or encapsulating the preform by the matrix. The barrier means prevents, inhibits or terminates growth upon contact with the barrier means, and substantially no "overgrowth" of the polycrystalline material occurs. The resulting ceramic composite product includes a preform infiltrated or embedded to its boundaries by a ceramic matrix comprising a polycrystalline material consisting essentially of the oxidation reaction product of the parent metal with the oxidant and, optionally, one or more metallic constituents such as non-oxidized constituents of the parent metal or reduced constituents of an oxidant.

A preferred embodiment employing a barrier means with a preform is illustrated in the accompanying FIGS. 1-7, and further explained in Example 1. Here the preform typically may comprise silicon carbide having a mesh size of 500. The defined surface boundary is coated with a permeable layer of $CaSO_4$ (Plaster of Paris) which is to act as a barrier means. This layer is applied as a thixotropic slurry or paste which then sets by hydrolysis, facilitating handling of the lay-up. After the entire lay-up has been heated in a furnace to the process temperature range, the polycrystalline oxidation reaction product grows and infiltrates the preform to the defined surface boundary. The $CaSO_4$ prevents overgrowth of the polycrystalline material beyond the defined surface boundary of the infiltrated preform. After being heated during the oxidation reaction process, the $CaSO_4$ has dehydrolyzed, facilitating its easy removal from the surface of the preform by light gritblasting, scraping or tumbling in abrasive powder or grit.

Figure 12:
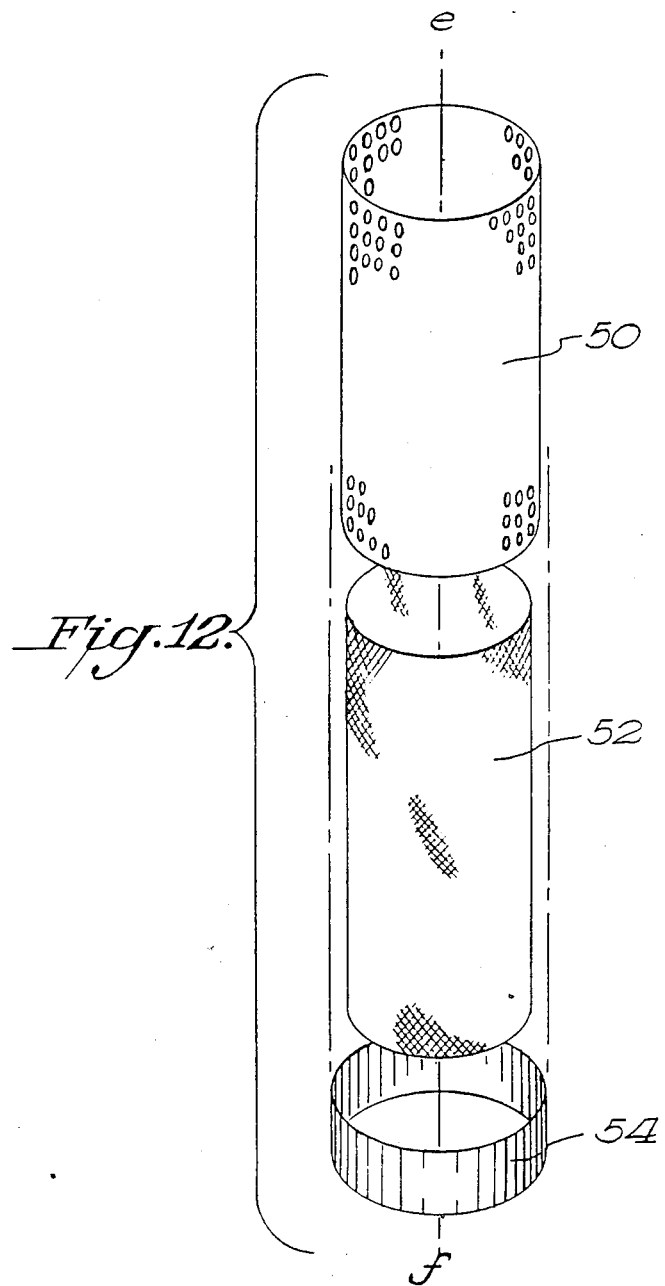
FIG. 12 is an exploded perspective view of the stainless steel barrier assembly of Example 6.

In still another embodiment for producing a composite having a negative cavity pattern inversely replicating a positive pattern of the parent metal precursor, the barrier per se is selected to possess sufficient structural integrity to support the set-up. Particulate filler material is packed around at least a portion of a shaped parent metal precursor, but there should be no seepage of the particulate through the porous barrier. In order to avoid seepage of the filler, the barrier means includes a foraminous or reticulated container such as sheath or sleeve (e.g. metal screen) enveloping the particulate filler. If this sheath is not structurally strong at the process conditions, the sheath can be reinforced with a second, stronger sleeve (e.g. a ceramic, steel or steel alloy cylinder) arranged concentrically with the reticulated sheath. The cylinder has a perforated pattern to allow the vapor-phase oxidant to permeate the sleeve and sheath and to contact the molten parent metal, but the combination of cylinder and sheath prevents the particulate filler from seeping through the barrier means. The surface geometry of the filler is congruent to the interior surface of the container, which is then replicated by the resulting composite product. FIG. 12 and Example 6 depict this embodiment of a barrier means in the form of a metal container for a vertical lay-up.

It should be understood that certain barriers referred to herein may undergo chemical changes or alterations in composition or species under the process conditions. In the case of an applied barrier composition comprising a mixture of calcium sulfate (Plaster of Paris) and alumina particles, for example, under the process conditions, the mixture can form calcium aluminum oxysulfate. A barrier comprised of AISI 304 stainless steel can oxidize under process conditions to the constituent metal oxides. Any undesired barrier materials remaining can be easily removed from the ceramic body.

The ceramic composite obtained by the practice of the present invention will usually be a coherent product wherein between about 5% and about 98% by volume of the total volume of the ceramic composite product is comprised of one or more of the preform materials embedded to the defined surface boundary of the preform with a polycrystalline material matrix. The polycrystalline material matrix is usually comprised of, when the parent metal is aluminum, about 60% to about 99% by volume (of the volume of polycrystalline material) of interconnected u-alumina oxide and about 1% to 40% by volume (same basis) of nonoxidized constituents of the parent metal.

Although the present invention is hereinafter described with particular emphasis on systems wherein aluminum or an aluminum alloy is employed as the parent metal and alumina is the intended oxidation reaction product, this reference is for exemplary purposes only, and it is to be understood that the present invention is adaptable by application of the teachings herein to other systems wherein other metals such as tin, silicon, titanium, zirconium, etc., are employed as the parent metal, and the intended oxidation reaction product is that metal oxide, nitride, boride, carbide, or the like. Thus, the barrier means may depend upon such factors as choice of parent metal, dopants, ceramic matrix, composition of the filler material, and process conditions. Calcium sulfate may be a useful barrier in such other systems when the conditions are somewhat similar to aluminum, as for example in the case of tin with air as the oxidant. On the other hand, calcium sulfate would not be a suitable barrier for a process carried out in a temperature region or under reaction conditions wherein calcium sulfate is not stable, e.g. titanium in a nitrogen atmosphere, which oxidation reaction is in excess of 2000° C. For such high temperature reactions, a dense alumina ceramic or zirconia ceramic, for example, which otherwise satisfies the criteria herein of a barrier, might be employed which can withstand the high temperature of the process while maintaining the characteristics necessary for a barrier.

In the process of this invention, the vapor-phase oxidant is normally gaseous or vaporized at the process conditions to provide an oxidizing atmosphere, such as atmospheric air. Typical vapor oxidants include, for example, elements or compounds of the following, or combinations of elements or compounds of the following, including volatile or vaporizable elements, compounds or constituents of compounds, or mixtures: oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbons as a source of carbon), and mixtures such as air, $H_2/H_2O$, and $CO/CO_2$, the latter two (i.e., $H_2/H_2O$ and $CO/CO_2$) being useful in reducing the oxygen activity of the environment. Oxygen or gas mixtures containing oxygen (including air) are suitable vapor-phase oxidants, with air usually being preferred for obvious reasons of economy. When a vapor-phase oxidant is identified as containing or comprising a particular gas or vapor, this means a vapor-phase oxidant in which the identified gas or vapor is the sole, predominant or at least a significant oxidizer of the parent metal under the conditions obtained in the oxidizing environment utilized. For example, although the major constituent of air is nitrogen, the oxygen content of air is normally the sole oxidizer of the parent metal under the conditions obtained in the oxidizing environment utilized. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which typically contains about 96 volume percent nitrogen and about 4 volume percent hydrogen.

The oxidant may also include a solid oxidant and/or a liquid oxidant, which is solid or liquid at the process conditions. The solid oxidant and/or the liquid oxidant is employed in combination with the vapor-phase oxidant. When a solid oxidant is employed, it is usually dispersed or admixed through the entire filler bed or preform or through a portion of the bed or preform adjacent the parent metal, in particulate form, or perhaps as a coating on the bed or preform particles. Any suitable solid oxidant may be employed including elements, such as boron or carbon, or reducible compounds, such as oxides or borides of lower thermodynamic stability than the oxide or boride reaction product of the Parent metal.

If a liquid oxidant is employed in conjunction with the vapor-phase oxidant, it may be dispersed throughout the entire filler bed or preform or a portion thereof adjacent to the parent metal, provided such liquid oxidant does not block access of the molten metal to the vapor-phase oxidant. Reference to a liquid oxidant means one which is a liquid under the oxidation reaction conditions and so a liquid oxidant may have a solid precursor such as a salt, which is molten or liquid at the oxidation reaction conditions. Alternatively, the liquid oxidant may be a liquid precursor, e.g., a solution of a material, which is used to coat part or all of the porous surfaces of the filler bed or preform and which is melted or decomposed at the process conditions to provide a suitable oxidant moiety. Examples of liquid oxidants as herein defined include low melting glasses.

Although the invention is described below with particular reference to a preform in the formation of composite bodies, it should be understood that loose filler beds are also applicable and useful in the practice of this invention.

The preform should be sufficiently porous or permeable to allow the vapor-phase oxidant to permeate the preform and contact the parent metal. The preform also should be sufficiently permeable to accommodate growth of the oxidation reaction product within the preform without substantially disturbing, upsetting or otherwise altering the configuration or geometry of the preform. In the event the preform includes a solid oxidant and/or liquid oxidant which may accompany the vapor-phase oxidant, the preform then should be sufficiently porous or permeable to permit and accept growth of the oxidation reaction product originating from the solid and/or liquid oxidant. It should be understood that whenever "preform" or "permeable preform" is referred to herein, it means a permeable preform possessing the foregoing porosity and/or permeability properties unless otherwise stated.

The permeable preforms may be created or formed into any predetermined desired size and shape by any conventional methods, such as slipcasting, injection molding, transfer molding, vacuum forming, or otherwise, by processing any suitable material(s), more specifically identified and described elsewhere. The permeable preform, as was previously mentioned, may include a solid oxidant and/or a liquid oxidant, used in conjunction with a vapor-phase oxidant as the oxidant. The permeable preform should be manufactured with at least one surface boundary, and such as to retain a significant shape integrity and green strength, as well as dimensional fidelity after being infiltrated and embedded by the ceramic matrix. The permeable preform, however, should be permeable enough to accept the growing polycrystalline oxidation reaction product. The permeable preform should also be capable of being wetted by the parent metal, and of such constituency that the polycrystalline oxidation reaction product can bond or adhere to and within the preform to produce a ceramic composite product of high integrity and well-defined borders.

The preform may be of any size or shape, as long as it contacts or is adjacent to the metal surface of the parent metal and has at least one surface boundary with a superimposed barrier means which defines the destination for the growing polycrystalline matrix. By way of example only, the preform may be hemispherical in shape with the flat surface boundary in contact with the parent metal surface and the dome-shaped surface boundary representing the defined surface boundary to where the polycrystalline material is to grow; or the preform may be cubical in shape with one square surface boundary contacting the metal surface of the parent metal and the remaining five square surface boundaries being the objective points for the growing polycrystalline matrix. A matrix of the polycrystalline material resulting from the oxidation reaction product growth is simply grown into the permeable preform so as to infiltrate and embed the latter to its defined surface boundary with the barrier means without substantially disturbing or displacing it.

The permeable preform of this invention may be composed of any suitable material, such as ceramic and/or metal particulates, powders, fibers, whiskers, wires, particles, hollow bodies or spheres, wire cloth, solid spheres, etc., and combinations thereof. The preform materials can comprise either a loose or bonded array or arrangement, which array has interstices, openings, intervening spaces, or the like, to render the preform permeable to the oxidant and the infiltration of molten parental metal to allow for the formation of oxidation reaction product growth without altering the configuration of the preform. The preform may include a lattice of reinforcing rods, bars, tubes, tubules, plates, wires, spheres or other particulates, wire cloth, ceramic refractory cloth or the like, or a combination of any of the foregoing, prearranged in a desired shape. Further, the material(s) of the preform may be homogeneous or heterogeneous. The suitable materials of the preform, such as ceramic powders or particulate, may be bonded together with any suitable binding agent, or the like, which does not interfere with the reactions of this invention, or leave any undesirable residual by-products within the ceramic composite product. Suitable particulates, such as silicon carbide or alumina, may have a grit size of from about 10 to 1000 or smaller or an admixture of grit sizes and types may be used. The particulate may be molded by known or conventional techniques as by forming a slurry of the particulate in an organic binder, pouring the slurry into a mold, and then letting the mold set as by drying or curing at an elevated temperature.

More specifically with respect to the suitable materials that may be employed in the formation and manufacture of the permeable preform or filler bed of this invention, three classes of useful materials may be identified as suitable materials for the permeable preform.

The first class contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum is the parent metal and air or oxygen is employed as the oxidant. Such materials include the single-metal oxides of: aluminum, $Al_2O_3$; cerium, $CeO_2$; hafnium, $HfO_2$; lanthanum, $La_2O_3$; neodymium, $Nd_2O_3$, praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgOAl_2O$, are contained in this class of stable refractory compounds.

The second class of suitable materials for the preform are those which are not intrinsically stable in the oxidizing and high temperature environment of the preferred embodiment, but which can be used due to relatively slow kinetics of the degradation reactions. An example in the case of aluminum with oxygen or air in forming alumina ceramic matrix is silicon carbide. This material would oxidize completely under the conditions necessary to oxidize the aluminum were it not for a protective layer of silicon oxide forming and covering the silicon carbide particles to limit further oxidation of the silicon carbide.

A third class of suitable materials for the preform of this invention are those which are not, on thermodynamic or on kinetic grounds, expected to survive the oxidizing environment or the exposure to molten metal necessary for practice of the invention. Such materials can be made compatible with the process of the present invention if (1) the environment is made less active, for example through the use of $H_2O$ or $CO/CO_2$ as the oxidizing gases, or (2) through the application of a coating thereto, such as aluminum oxide, which makes the species kinetically non-reactive in the oxidizing environment. An example of such a class of materials would be carbon fiber employed in conjunction with a molten aluminum parent metal. If the aluminum is to be oxidized with air or oxygen at, for example 1250° C. to generate a matrix incorporating a preform containing said fibers, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant. Alternatively, the tendency of the carbon filler to react with the oxidant can be controlled by employing a $CO/CO_2$ atmosphere as oxidant which tends to be oxidizing to the aluminum but not the contained carbon fiber.

A preform used in the practice of this invention may be employed as a single preform or as an assemblage of preforms to form more complex shapes. It has been discovered that the polycrystalline matrix material can be grown through adjacent, contacting portions of a preform assemblage to bond contiguous preforms into a unified, or integral ceramic composite. The assembly of preforms is arranged so that a direction of growth of the oxidation reaction product will be towards and into the assembly of preforms to infiltrate and embed the assembly to the barrier means of the assemblage of preforms bonding them together. Thus, complex ceramic composites can be formed as an integral body which cannot otherwise be produced by conventional manufacturing techniques. It should be understood that whenever "preform" is referred to herein, it means a preform or an assemblage of preforms unless otherwise stated.

As a further embodiment of the invention and as explained in the Commonly Owned Patent Applications, the addition of dopant materials in conjunction with the parent metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, (2) may be applied to at least a portion of the surface of the parent metal, or (3) may be applied to the filler bed or preform or to a part thereof, e.g., the support zone of the preform, or any combination of two or more of techniques (1), (2) and (3) may be employed. For example, an alloyed dopant may be used in combination with an externally applied dopant. In the case of technique (3), where a dopant or dopants are applied to the filler bed or preform, the application may be accomplished in any suitable manner, such as by dispersing the dopants throughout part or the entire mass of the preform as coatings or in particulate form, preferably including at least a portion of the preform adjacent the parent metal. Application of any of the dopants to the preform may also be accomplished by applying a layer of one or more dopant materials to and within the preform, including any of its internal openings, interstices, passageways, intervening spaces, or the like, that render it permeable. A convenient manner of applying any of the dopant material is to merely soak the entire bed in a liquid (e.g., a solution) of dopant material. A source of the dopant may also be provided by placing a rigid body of dopant in contact with and between at least a portion of the parent metal surface and the preform. For example, a thin sheet of silicon-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable preform occurs. In the case where the dopant is externally applied to at least a portion of the surface of the parent metal, the polycrystalline oxide structure generally grows within the permeable preform substantially beyond the dopant layer (i.e., to beyond the depth of the applied dopant layer). In any case, one or more of the dopants may be externally applied to the parent metal surface and/or to the permeable preform. Additionally, dopants alloyed within the parent metal and/or externally applied to the parent metal may be augmented by dopant(s) applied to the preform. Thus, any concentration deficiencies of the dopants alloyed within the parent metal and/or externally applied to the parent metal may be augmented by additional concentration of the respective dopant(s) applied to the preform and vice versa.

Useful dopants for an aluminum parent metal, particularly with air as the oxidant, include, for example, magnesium metal and zinc metal, in combination with each other or in combination with other dopants as described below. These metals, or a suitable source of the metals, may be alloyed into the aluminum-based parent metal at concentrations for each of between about 0.1–10% by weight based on the total weight of the resulting doped metal. Concentrations within this range appear to initiate the ceramic growth, enhance metal transport and favorably influence the growth morphology of the resulting oxidation product. The concentration for any one dopant will depend on such factors as the combination of dopants and the process temperature.

Other dopants which are effective in promoting polycrystalline oxidation reaction growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying material to be added at a lower temperature.

One or more dopants may be used depending upon the circumstances, as explained above. For example, in the case of an aluminum parent metal and with air as the oxidant, particularly useful combinations of dopants include (a) magnesium silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials useful with an aluminum parent metal include sodium, lithium, calcium, boron, phosphorus and yttrium which may be used individually or in combination with one or more dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable preform in selected areas. Thus, growth of the polycrystalline ceramic material into the permeable preform can be controlled by the localized placement of the dopant material upon the parent metal surface. The applied coating or layer of dopant is thin relative to the thickness of the parent metal body, and growth or formation of the oxidation reaction product into the permeable preform extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant having a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than about 0.0008 gram of dopant per gram of parent metal to be oxidized and greater than 0.003 gram of dopant per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy, and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

The invention will be illustrated by the following examples which are given by way of illustration and are not intended to be limiting.

EXAMPLE 1

Figure 2:
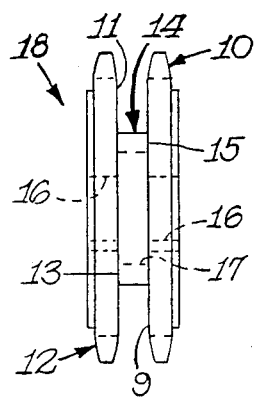
FIG. 2 is a cross-sectional view of the assembled preform of FIG. 1.

Referring in detail to FIGS. 1-7, wherein the same numerals designate similar parts throughout, an intricate ceramic body was fabricated by infiltration of a preform with a ceramic matrix. As shown in FIGS. 1 and 2, the preform comprised an assembly of three separately fabricated preform components 10, 12, and 14 which were bonded together with an organic binder (Elmer's wood glue). Each of the three preform components was formed by the same conventional method wherein silicon carbide particles were uniformly admixed with an organic binder solution (Elmer's wood glue and water in a 4 to 1 ratio); and the resulting mixture was poured into a silicone rubber mold and allowed to air dry to set. Preform components 10 and 12 each comprised 500 grit silicon carbide particles mixed with the above organic binder solution before pouring into the rubber mold. Preform component 14 comprised 220 grit silicon carbide particles processed in a manner similar to components 10 and 12 except for the geometry of the preform mold. The preform components comprised two sprockets 10 and 12, each 3 inches in outer diameter and 3/16 inch thick having a center key hole shaped bore 16; and one cylinder 14, 1.63 inches in outer diameter and 1.13 inches in internal diameter and 0.33 inch in height. The three rigid preform components were assembled along axis a-b shown in the exploded perspective of FIG. 1 such that surface 9 of preform component 10 was contacted with surface 15 of preform component 14; and surface 11 of preform component 12 was contacted with surface 13 of preform component 14. The resulting geometry of the assembled preform indicated generally at 18 is shown in FIG. 2.

Figure 3:
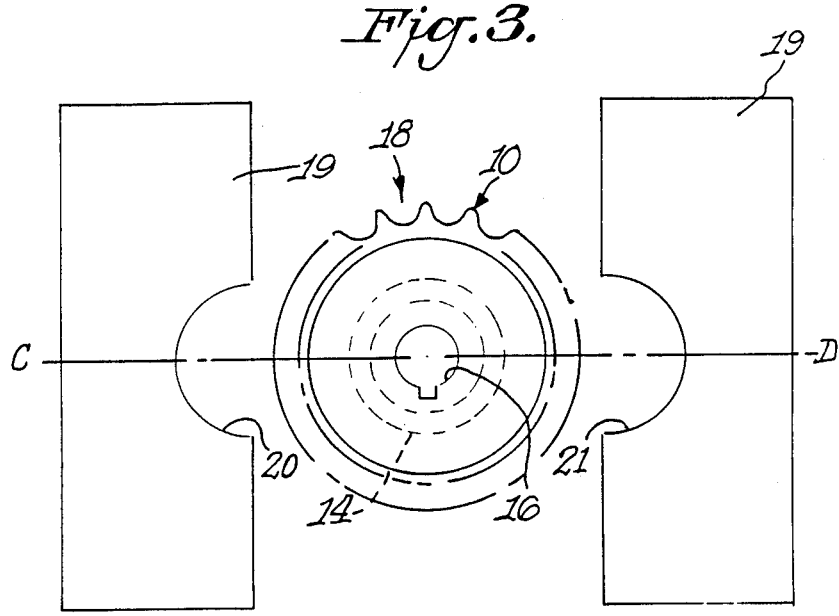
FIG. 3 is a plan view of the preform of FIG. 2 showing the parent metal plate before contacting with the preform.
Figure 4:
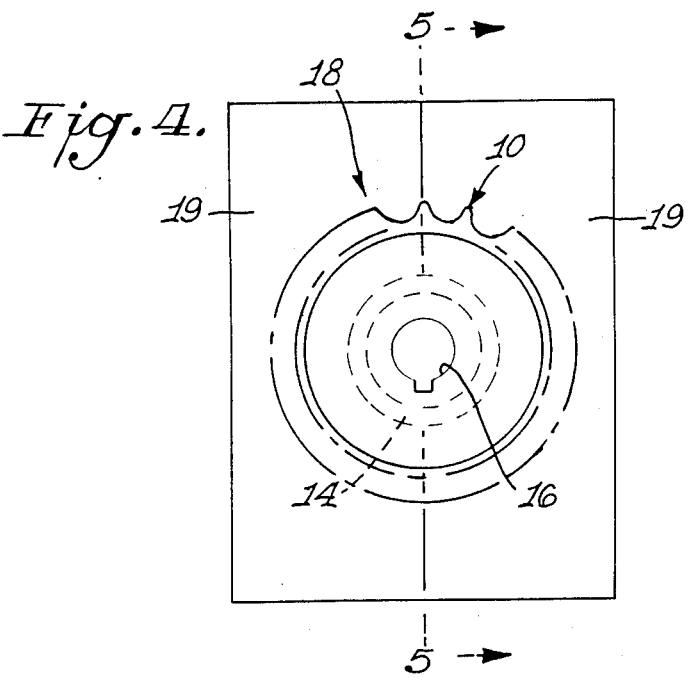
FIG. 4 is a plan view of the assembly of preform and parent metal in accordance with Example 1.

As illustrated in FIG. 3, a generally rectangular plate 19 of commercial aluminum alloy 380.1 served as the parent metal. This alloy was obtained from Belmont Metals Inc. and had a nominally identified composition by weight of 8-8.5% Si, 2-3% Zn and 0.1% Mg as active dopants, and 3.5% Cu as well as Fe, Mn, and Ni, but the actual Mg content was sometimes higher as in the range of 0.17-0.18%). The plate 19 measured approximately 5 inches long by 4 inches wide by 0.30 inch thick and had a circular bore located approximately at the geometric center of the plate. Plate 19 was sawed in half as to bisect this center bore, thereby having semicircular recesses 20 and 21. The split plate 19 was then assembled by moving the halves of plate 19 toward preform 18 along axis c-d and into abutment such that the entire outer surface of preform component 14 was circumscribed by recesses 20 and 21 of plate 19. This center bore now formed by the two recesses 20 and 21 was slightly larger in diameter than the outer diameter of preform component 14 to allow for the thermal expansion of the alloy during processing. The resulting assembly is shown in FIG. 4.

A barrier layer 22 approximately 0.03 to 0.06 inch thick, comprising a slurry of Plaster of Paris (Bondex, which contained about 35% by weight calcium carbonate, from Bondex Inc. of St. Louis, MO), was applied to all surfaces of the assembly, was FIG. 4, which would normally be exposed to the atmosphere. However, space 24 between plate 19 and preform components 10 and 12 was not filled with the barrier as to allow for thermal expansion of the heated alloy. The barrier was applied by painting the exposed surfaces with the slurry, and the barrier 22 was allowed to set and then dried at room temperature to remove excess moisture. FIG. 5 shows the assembled system with the barrier layer applied.

As illustrated in FIG. 6 the assembly of FIG. 5 was submerged in a bed of alumina particles 25 (E1 Alundum from Norton Co., 90 grit) which was contained in a refractory vessel 26. This lay-up, was placed in a furnace (which was vented to allow for the flow of air) at 250° C. and heated up at a rate of 300° C./hour to 1000° C. The system was held at 1000° C. for 96 hours, and the lay-up was removed hot so that the excess aluminum alloy could be poured off while molten (which was accomplished by breaking away a portion of the barrier covering the alloy, and then draining off the molten metal).

The Plaster of Paris barrier, dehydrated by the process temperature, was easily removed from the surface of the assembly by light sandblasting without disturbing the surface of the composite.

Figure 7A:
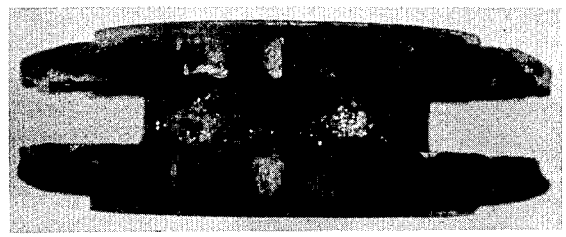
FIGS. 7a and 7b are photographs in elevational and plan view, respectively, of the composite formed in accordance with Example 1.
Figure 7B:
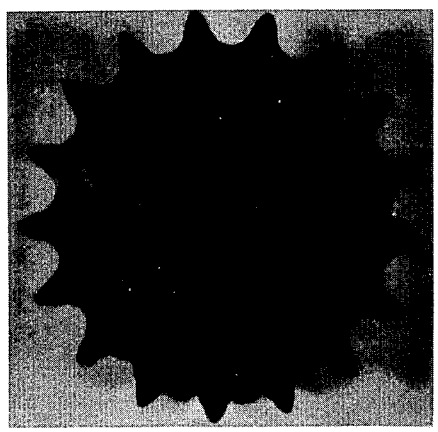

Examination of the assembly revealed that the $\alpha$-alumina ceramic matrix ($\alpha$-alumina identified by x-ray diffraction analysis of the material) had infiltrated preform 18 up to the barrier coated boundary surfaces but did not overgrow those boundary surfaces. In addition, the molten alloy had formed an oxide skin beneath the barrier layer 22; however, there was no oxide growth from the molten alloy body beyond this oxide skin in areas not contacting the preform. The oxide skin was easily removed by light sandblasting, and photographs of the resulting ceramic article is shown in FIGS. 7a and 7b.

The present example is illustrative of the utility of a barrier comprising Plaster of Paris (with calcium carbonate) in preventing overgrowth of a preform by an infiltrating ceramic matrix thereby obtaining a net shape. The present Example is additionally demonstrative of the ability of a Plaster of Paris barrier to efficiently contain a molten body of aluminum thereby mitigating loss of the alloy precursor to oxidation prior to infiltration of the preform thus minimizing the amount of alloy precursor necessary to completely infiltrate a preform body.

EXAMPLE 2

A cylindrical composite with a smooth internal surface was fabricated in the shape of a crucible closed at one end (measuring 3 inches long by 1 inch in external diameter with a 3 mm wall thickness), by growing a ceramic matrix into a crucible preform coated on its interior surfaces with a barrier material.

The preform was fabricated by a conventional slip casting technique. A slurry comprising 47.6 weight percent alumina particles (E67 Alundum, from Norton, Co., 1000 mesh size), 23.7 weight percent Kaolin clay (EPK, Georgia Kaolin, Union, NJ, 98% less than 20 $\mu$m particle size) and 28.5 weight percent water, was mixed uniformly, and poured into a Plaster of Paris mold having the desired geometry of the preform. The crucible preform was cast for approximately 20 minutes, dried at 90° C. and then prefired at 700° C. for 30 minutes in air.

The preform was coated on its interior surfaces with a slurried mixture comprising 70 weight percent of Bondex Plaster of Paris and 30 weight percent silicon dioxide particles (500 mesh size), and the barrier layer was allowed to set and dried to remove excess moisture.

A refractory vessel was partially filled with aluminum alloy 380.1 (having the same nominally identified composition as in Example 1) and heated until the alloy was molten. The preform was filled with zirconia spheres (⅛ inch in diameter) and placed into the molten aluminum-filled refractory vessel such that the level of molten metal surrounding the preform substantially covered its outer geometry without spilling into the interior of the crucible. The zirconia spheres were employed to give the crucible sufficient weight to overcome its buoyancy in molten aluminum and thus maintain the outer surface of the preform in contact with the molten alloy. A layer of dry Plaster of Paris powder followed by a layer of silicon dioxide were placed on top of the molten alloy to mitigate oxidation of the molten alloy on the otherwise exposed surface. This lay-up was placed into a furnace (vented to allow for the flow of air), which was at 1000° C., and held there for 96 hours.

Figure 8:
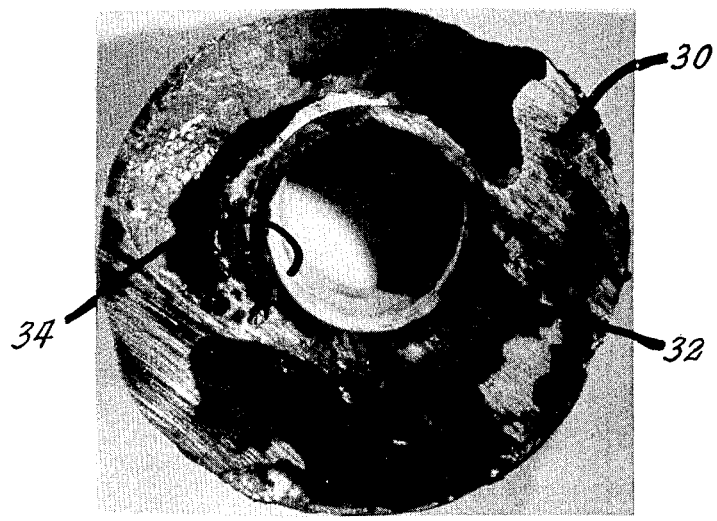
FIG. 8 is a photograph of the cross-sectional composite crucible formed in accordance with Example 2 showing the internal surface of the crucible.

The lay-up was removed from the furnace; and, after cooling, the ceramic crucible and the attached surrounding excess alloy were removed from the refractory vessel, the zirconia spheres removed, and the piece cross-sectioned at the top and bottom exposing the composite. The barrier, dehydrated by the reaction conditions, was easily removed by lightly sandblasting the interior of the cross-sectioned piece. Examination of the cross-sectioned surfaces showed complete infiltration of the preform by an α-alumina matrix (as evidenced by X-ray powder diffraction analyses of the material) to the barrier layer on the interior of the preform, but not beyond that layer. Referring to FIG. 8, the excess unreacted aluminum 30 surrounds the exterior of the ceramic composite 32. The internal surface 34 of the composite, which was coated by the barrier layer, is smooth and shows no overgrowth, thereby achieving high fidelity of the interior wall. The excess alloy can be removed by melting and separating the ceramic part without damaging or degrading the composite.

X-ray powder diffraction analysis of the removed barrier material showed the post-process composition of the barrier to be predominantly calcium silicate with minor amounts of unreacted calcium sulfate and silicon dioxide (in the α-quartz form).

EXAMPLE 3

An elbow-shaped composite ceramic tube with one open end and one closed end, having a smooth external surface, was fabricated by the infiltration of a preform with a ceramic matrix.

The preform was produced by a conventional sediment casting technique. A uniform mixture was prepared comprising 65 weight percent of 500 mesh alumina particles (38 Alundum, from Norton Co.), 30 weight percent of 200 mesh alumina particles (38 Alundum), and 5 weight percent of silicon metal particles (500 mesh size). The mixture was slurried with an organic binder solution (as described in Example 1), poured into a silicone rubber mold and dried to set. The preform was removed from the mold and the residual moisture removed by drying, the preform was then prefired in air at 1300° C. for 2 hours.

A barrier material was applied to the outer surface of the preform by coating the surface with an approximately 0.2 mm thick layer of a slurried mixture comprising 50 weight percent of Bondex Plaster of Paris and 50 weight percent of alumina particles (38 Alundum, Norton Co., 500 mesh). The barrier layer was allowed to set and dried to remove excess moisture; and the coated preform was placed into a refractory vessel and supported by refractory alumina spheres (⅛–¾ inch in diameter) such that the open end of the preform was flush with the alumina spheres.

The lay-up was placed in a furnace at 1000° C. to heat the preform to reaction temperature. The furnace was opened and molten aluminum alloy 380.1 (having the same nominal composition as given in Example 1) was poured into the open end of the preform up to the level of the open end, and thus the entire internal geometry of the preform was in contact with the molten alloy body.

The lay-up was held at 1000° C. for 96 hours, then removed from the furnace while hot, and the excess unreacted alloy was poured from the ceramic tube while still molten.

Figure 9:
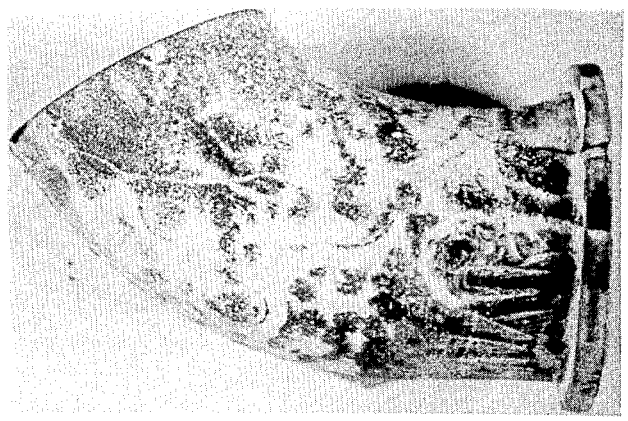
FIG. 9 is a photograph of the exterior surface of the composite body formed in accordance with Example 3.

After cooling the ceramic tube, the barrier layer was removed from the outer surface by light sandblasting. The ceramic tube was cross-sectioned approximately ¼ inch from the open end. Examination of the cross-sectioned composite showed that an α-alumina matrix (as evidenced by X-ray powder diffraction analysis) had completely infiltrated the preform up to the outer barrier layer. The outer surface of the ceramic shown in FIG. 9, which had been coated by the barrier, exhibited a smooth morphology with no overgrowth.

Post-process analysis of the removed barrier material showed the barrier composition to be predominantly calcium aluminum oxysulfate ($Ca_4Al_6O_{12}SO_4$) with minor amounts of α-alumina and unreacted calcium sulfate present, indicating the conversion of the barrier materials under the process conditions.

EXAMPLE 4

A ceramic sprocket was fabricated by infiltrating a preform with a ceramic matrix and employing a barrier material to control the geometry of the sprocket surface.

The preform (having the same dimensions and geometry as preform components 10 and 12 in Example 1) was fabricated by a conventional sediment-casting technique wherein 500 grit silicon carbide particles were uniformly admixed with an organic binder solution (as described in Example 1), poured into a silicone rubber mold and allowed to set for 6 hours. The excess water was removed from the surface of the sediment and the preform was dried. Two to three grams of silicon metal (2.0 mesh) were uniformly dispersed on the face of a disk of aluminum alloy 380.1 (having the nominal composition described in Example 1), measuring 3½ inches in diameter and ½ inch thick. The rigid preform was removed from the mold and placed on the alloy face with the silicon such that the bottom surface of the sprocket preform (analogous to surface 9 of preform 10 in FIG. 1) was in contact with the circular face of the alloy.

The entire assembly of preform and alloy was coated on all exposed surfaces by a barrier material. The barrier material comprised an aqueous slurried admixture of 25 weight percent Plaster of Paris (Bondex), 25 weight percent portland cement (Type 1 from Keystone, Bath, PA), 25 weight percent silicon dioxide (Crystobalite, from CED Minerals, Ohio, 200 mesh) and 25 weight percent alumina particles (38 Alundum, from Norton, 36 grit). The slurry was applied to the assembly on all exposed surfaces in a 1/16–⅛ inch thick layer and was allowed to set and then dried to remove excess moisture. The barrier covered assembly was placed on top of a bed of silicon carbide particles (24 grit) contained in a refractory vessel.

Figure 10:
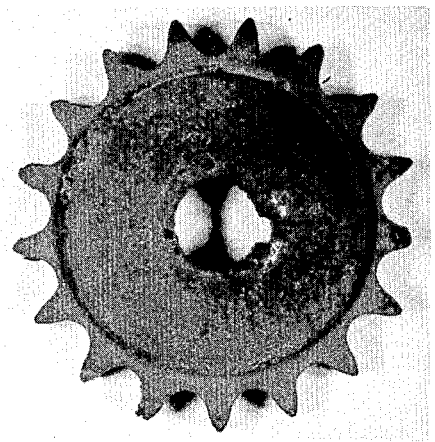
FIG. 10 is a photograph of the resulting composite fabricated in accordance with Example 4.

The above lay-up was placed in a furnace (which was vented to allow for the flow of air) and heated over a period of 5 hours to 900° C. The furnace was held at 900° C. for 80 hours, and then cooled down over a 5-hour period. The lay-up was taken out of the furnace, and the assembly removed from the bed. The barrier layer was removed from the surfaces of the assembly by light sandblasting, and the excess alloy was separated from the ceramic sprocket. The ceramic sprocket, shown in FIG. 10, had substantially no overgrowth by the α-alumina matrix on the surface coated with the barrier material. The few isolated spots of overgrowth on the sprocket surface are due to imperfections in the barrier coating (i.e., fissures or air pockets) and are not a result of penetration of the barrier itself.

EXAMPLE 5

A ceramic sprocket was fabricated by the infiltration of a barrier coated preform, identical to that in Example 4, and by the procedure therein except that the barrier material comprised only portland cement (Type 1, from Keystone Co.).

An aqueous slurry of Portland cement was applied as a 1/16–⅛ inch layer to the assembly of the sprocket preform and the 380.1 aluminum alloy disk, as in Example 4 (including the silicon layer as therein described). The barrier layer was allowed to set and dried to remove excess moisture. The coated assembly was placed on a bed of silicon carbide particles (24 mesh), which was contained in a refractory vessel, as in Example 4. The lay-up was placed into a furnace and heated up during a 10-hour period to 900° C. where it was held for 80 hours. The furnace was cooled over 5 hours, and the lay-up was removed. The coated assembly was removed from the bed, the barrier layer was easily removed from the surface of the ceramic composite by light sandblasting, and the excess alloy was separated from the ceramic composite sprocket.

Figure 11:
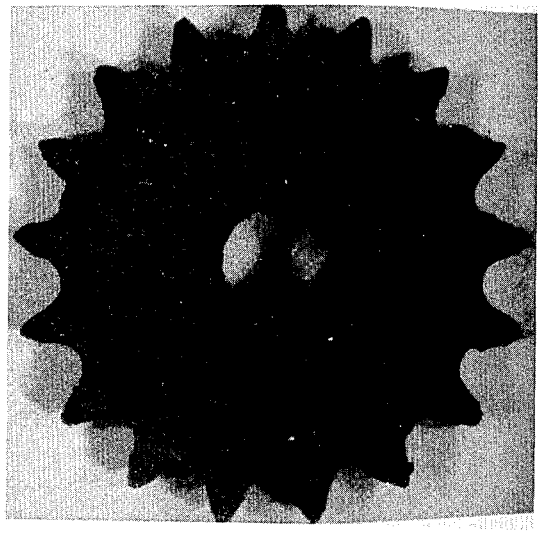
FIG. 11 is a photograph of the resulting composite fabricated in accordance with Example 5.

Examination of the resulting ceramic composite showed the α-alumina ceramic matrix had infiltrated the preform completely up to the barrier layer. The portland cement barrier layer effectively prevented overgrowth of preform boundaries by the ceramic matrix. The composite ceramic sprocket is shown in FIG. 11. As in Example 4, isolated incidents of overgrowth on the sprocket surface are due to imperfections in the barrier coating and not to penetration of same.

EXAMPLE 6

A ceramic composite structure having a cylindrical shape, measuring approximately 3¼ inches in diameter and 26 inches long, was fabricated by employing a cylindrical barrier means to attain the external cylindrical shape of the article. The barrier means shown as an exploded perspective in FIG. 12 comprised a three piece stainless steel structure (number 304 stainless steel having a nominal composition by weight of 0.08% C, 2% Mn, 1% Si, 0.045% P, 0.03% S, 18–20% Cr, 8–12% Ni; balance being Fe) comprising a perforated cylinder 50, a screen lining 52 and a bottom cap 54. The perforated cylinder 50 measured 3¼ inches in internal diameter and was constructed of 22 gauge stainless steel perforated uniformly over its surface area with holes 0.0625 inch in diameter such that 40% of the surface area of the cylinder was open for diffusion of air. The screen lining 52 measured approximately 3¼ inches in outer diameter and 0.080 inch thick, and its mesh comprised 0.016 inch diameter holes such that 30% of its surface area was open to diffusion of air. The bottom cap 54 was also constructed of 22 gauge stainless steel. The screen lining 52 was employed to prevent particles of filler material from escaping through the larger perforations in the outer sleeve during processing.

The stainless steel barrier was assembled along axis e-f in FIG. 12. A rod of aluminum (having an alloyed composition by weight of 10% silicon and 3% magnesium), measuring 26 inches long and 1 1/16 inches in diameter, having 16 fin-like protrusions over the center two thirds of its length, was covered uniformly over its entire surface with a layer of silicon dioxide particles (predominantly 100 mesh size or larger), employed as a dopant material and applied thereto with an organic binder. The rod was longitudinally placed in the center of the cylindrical barrier assembly. The assembly was then filled with a uniformly premixed filler material comprising 95 weight percent alumina particles (E38 Alundum, from Norton Co., 90 mesh size) and 5 weight percent silicon dioxide (predominantly 100 mesh or larger) thus surrounding and supporting the aluminum rod.

The above system was placed in a refractory vessel, standing on its bottom cap. The resulting lay-up was placed in a furnace (vented to allow for the flow of air) and heated up over a 10-hour period to 1250° C. The furnace was held at 1250° C. for 225 hours, and then cooled down over a 30-hour cycle and the lay-up was removed.

Examination of the resulting composite material showed a ceramic cylinder comprising an α-alumina matrix embedding the alumina filler material having the outer dimensions of the stainless steel barrier and an internal cavity replicating the shape of the original parent metal assembly. Because a barrier was used in shaping the cylindrical ceramic body, grinding only was required to make a smooth surface on the ceramic cylinder. In the absence of a barrier, the ceramic product would have an irregular shape thereby requiring extensive machining and grinding.

EXAMPLE 7

A ceramic composite block was fabricated by infiltrating a ceramic matrix into a shaped preform which was coated by a barrier to retain the growth of the ceramic matrix within the dimensions of the preform.

The preform, measuring 2 inches square by ½ inch thick, was fabricated by a conventional sediment casting technique whereby an aqueous slurry comprising 98 weight percent silicon carbide particles (a uniform admixture of 70 weight percent 500 grit and 30 weight percent 220 grit particles), 1.75 weight percent of a commercially available latex (Cascorez Latex EA-4177, from Bordon Co.) and 0.25 weight percent polyvinyl alcohol, was poured into a silicone rubber mold where it was allowed to settle. Excess water was removed from the top of the sediment, and the preform was dried in air. The dried preform was fired at 1250° C. for 24 hours in air.

A circular disk of aluminum alloy 380.1 (having the same nominal composition as specified in Example 1), measuring 3 inches in diameter and ½ inch thick, had a layer of 2 grams of silicon metal (−20 mesh) uniformly dispersed over the top circular face, and the preform was placed on top of that face.

The above-described assembly of preform and layered alloy disk was coated on its perimeter (i.e., all surfaces of the preform and disk except the abutting faces of preform and disk), with an aqueous slurry comprising calcium silicate (Vansil W10, from R. T. Vanderbilt, Norwalk, Conn.), such that the coating completely encased this assembly. The coating barrier was dried, and the thus forming a encased assembly was embedded in silicon carbide particles (24 grit), contained in a refractory vessel, such that the top coated square surface of the preform was exposed to the atmosphere and substantially flush with the level of the bed.

The above lay-up was placed into a furnace and heated up over a 5-hour period to 900° C. The furnace was held at 900° C. for 100 hours and subsequently cooled down over a 5-hour period, at which time the lay-up was removed from the furnace.

The barrier-coated assembly was removed from the bedding and the barrier was separated from the assembly by light sandblasting. Examination of the assembly showed that the ceramic matrix comprising α-alumina, formed by the oxidation of the aluminum disk, had infiltrated the preform up to the perimeter of the preform established by the barrier. Isolated incidental overgrowth of the preform was attributed to imperfections in the barrier coating and not to the penetration of the composition of said barrier.

EXAMPLE 8

Figure 13A:
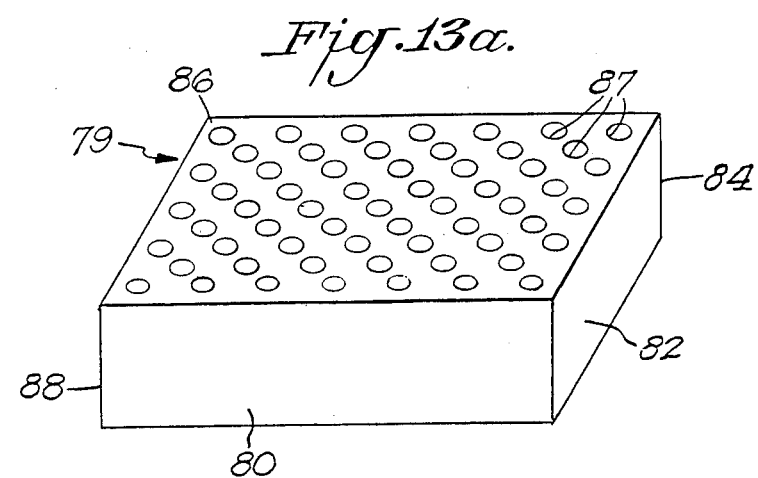
FIG. 13a is a perspective view of the stainless steel barrier of Example 8.
Figure 13B:
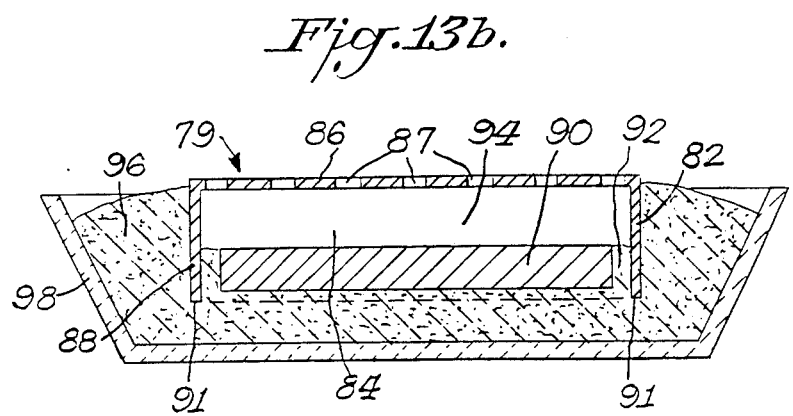
FIG. 13b is a cross-sectional view showing the assembly of the barrier of FIG. 13a overlaying a parent metal placed into an inert bed contained in a refractory vessel as in Example 8.

A ceramic body was produced having defined rectangular dimensions established by a barrier means fabricated from stainless steel (AISI 304, 22 gauge) into a rectangular structure. Referring in detail to FIGS. 13a and 13b, wherein the same numerals designate similar parts throughout, an open-ended rectangular box indicated as barrier means 79 is comprised of two rectangular side walls 80 and 84 measuring 9½ inches long by 2½ inches wide, two rectangular side walls 82 and 88 measuring 4½ inches long by 2½ inches wide, and one perforated top surface 86 measuring 9½ inches long by 4½ inches wide having perforations 87 uniformly covering its surface to allow the venting of air. The barrier was placed into a furnace and heated in air at 1000° C. for 24 hours and then removed from the furnace. As a result of heating, the barrier means was coated over its surface by an oxide coating.

Two rectangular bars of aluminum alloy 380.1 (having the same nominally identified composition as in Example 1), measuring 9 inches long by 4 inches wide by 1½ inches thick, were each placed into separate beds 96 of alumina particles (E1 Alundum, from Norton, 90 mesh size), contained in separate refractory vessels 98, such that one 9 inch by 4 inch face of the bar was exposed to the atmosphere and substantially flush with the alumina particle bed and the remaining five surfaces of the bar were submerged beneath the bedding. Two grams of a dopant material, silicon dioxide, were uniformly dispersed over the exposed 9 inch by 4 inch surface of each bar. Referring in detail now to FIG. 13b, the barrier was placed over one of the embedded aluminum bars such that the marginal edges 91 of the four side walls were submerged in the alumina particle bed to approximately the depth of the alloy bar, thus circumscribing the alloy bar but free from contact with the bar. The barrier was then surrounded by additional alumina particles (E1 Alundum as above) such that the outer surfaces of the side walls were substantially submerged in bed 96 contained by vessel 98, and space 94 remained between surface 90 of alloy bar 88 and the inside face of top surface 86.

The two embedded aluminum bars, one covered by the aforesaid barrier (as shown in FIG. 13b), were placed into a furnace (which was vented to allow for the flow of air) and heated up over a 10-hour period to 1080° C. The furnace was held at 1080° C. for 55 hours and then cooled down over 10 hours, at the end of which period the vessels containing the embedded bars were removed from the furnace.

Figure 14:
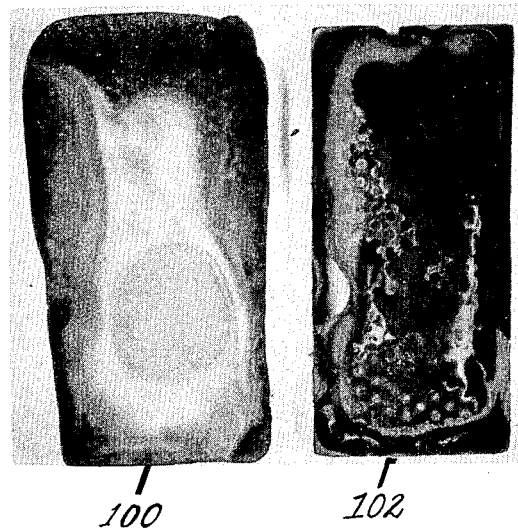
FIG. 14 is a photograph of the two composite bodies fabricated in Example 8.

The formed ceramic bodies were removed from the respective alumina beds, and the barrier was removed from the one contained ceramic body. Examination of the ceramic body 102 (see FIG. 14) fabricated with the barrier snowed that the body formed into space 94 and was constrained by the side walls of the barrier, thus resulting in a ceramic body having a rectangular perimeter defined by the perimeter of the barrier. (See FIG. 14.) The growth of the ceramic body did not, however, completely reach the top surface of the barrier, and hence the top surface of the ceramic body was not so defined. FIG. 14 also shows the other ceramic body 100 resulting from oxidation of the aforesaid aluminum alloy in air with no barrier, and exhibiting an irregular surface resulting from the unconstrained growth.

The present example is demonstrative of the utility of a barrier means in dictating the dimensions of a relatively large ceramic component, fabricated by the oxidation of aluminum in air, thus resulting in substantial mitigation of post-fabrication processing to obtain a desired shape.

EXAMPLE 9

A preform block was prepared of 500 grit silicon carbide and then set up with 380.1 aluminum alloy, as in Example 7. This set-up was coated on all surfaces (except at the interface between the preform and alloy) with a barrier material of ceramic grade bone ash (tricalcium phosphate) from Hamill and Gillespie, Inc., Livingston, NJ. The barrier was dried, and the assembly then embedded in 24 grit silicon carbide particles contained in a refractory vessel with the top of the coated preform exposed to the atmosphere. The lay-up was heated in a furnace with an air atmosphere to 900° C. over a period of 5 hours, held at 900° C. for 100 hours, and then cooled in the furnace over a 5-hour period and then removed from the furnace.

The barrier-coated assembly was removed from the bedding, and some overgrowth that occurred at the interface between the alloy and preform was easily removed by tapping. The barrier was removed from the composite product by sandblasting. Examination of the product showed that the preform was infiltrated by a ceramic matrix, comprising α-alumina, to the perimeter established by the barrier.

What is claimed is:

1. A method for producing a self-supporting ceramic body by oxidation of a parent metal to form a polycrystalline material comprising the oxidation reaction product of said parent metal with at least one oxidant including a vapor-phase oxidant said method comprising the steps of: (a) providing at least a portion of said parent metal with a barrier means at least partially spaced from said parent metal for establishing at least one surface of the ceramic body; (b) heating said parent metal to a temperature above its melting point but below the melting point of the oxidation reaction product to form a body of molten parent metal; (c) reacting said molten parent metal at said temperature with said oxidant to form said oxidation reaction product; (d) maintaining at least a portion of said oxidation reaction product in contact with and between said molten parent metal and said oxidant, to transport molten parent metal through the oxidation reaction product towards said barrier means and into contact with said oxidant so that fresh oxidation reaction product continues to form at an interface between the oxidant and previously formed oxidation reaction product; and (e) continuing said reaction until said oxidation reaction product contacts said barrier means to produce said ceramic body having said surface established by said barrier means.

2. A method for producing a self-supporting ceramic composite structure comprising a mass of filler material infiltrated by a ceramic matrix obtained by the oxidation of a parent metal to form a polycrystalline material, said polycrystalline material comprising the oxidation reaction product of said parent metal with at least one oxidant including a vapor-phase oxidant, said method comprising the steps of: (a) heating said parent metal to a temperature above its melting point but below the melting point of the oxidation reaction product to form a body of molten parent metal; (b) contacting a zone of said mass of filler material with said body of molten parent metal, said mass of filler material having at least one surface defined by a barrier means at least partially spaced from said contacting zone such that formation of said oxidation reaction product will occur into said mass of filler material and in a direction toward said barrier means; (c) reacting said molten parent metal at said temperature with said oxidant to form said oxidation reaction product; (d) maintaining at least a portion of said oxidation reaction product in contact with and between said molten parent metal and said oxidant, to progressively transport molten parent metal through the oxidation reaction product toward the oxidant so that fresh oxidation reaction product continues to form at an interface between said oxidant and previously formed oxidation reaction product that has infiltrated said mass of filler material; and (e) continuing said reaction until said oxidation reaction product contacts said barrier means to produce said ceramic composite structure having said surface established by said barrier means.

3. A method for producing a ceramic composite body of desired shape comprising at least one self-supporting preform infiltrated by a ceramic matrix obtained by oxidation of a parent metal to form a polycrystalline material, said polycrystalline material comprising the oxidation reaction product of said parent metal with at least one oxidant including a vapor-phase oxidant said method comprising the steps of: (a) heating said parent metal to a temperature above its melting point but below the melting point of the oxidation reaction product to form a body of molten parent metal; (b) providing at least one shaped, self-supporting preform having at least one surface defined by a barrier means, said at least one preform being permeable to infiltration by said oxidation reaction product; (c) contacting a zone of said at least one preform with said body of molten parent metal with said surface of said at least one preform spaced from said contacting zone such that formation of said oxidation reaction product will occur into said at least one preform and in a direction toward said surface; (d) reacting said molten parent metal at said temperature with said oxidant to form said oxidation reaction product; (e) maintaining at least a portion of said oxidation reaction product in contact with and between said molten parent metal and said oxidant, to progressively transport molten metal through said oxidation reaction product toward the oxidant so that fresh oxidation reaction product continues to form at an interface between said oxidant and previously formed oxidation reaction product that has infiltrated said at least one preform; and (f) continuing said reacting until said oxidation reaction product has infiltrated said at least one preform and contacted said barrier means to produce said ceramic composite body and having a configuration of said at least one preform and said surface established by said barrier means.

4. The method of claims 1, 2, or 3, wherein said barrier means is substantially non-wettable by said molten parent metal.

5. The method of claims 1, 2, or 3, wherein said barrier means reacts with said molten parent metal upon contact with said molten parent metal to form at least one reaction product which substantially impedes transport of said molten parent metal through said oxidation reaction product.

6. The method of claims 1, 2 or 3, wherein said barrier means comprises at least one material selected from the group consisting of calcium sulfate, calcium silicate, portland cement, tricalcium phosphate, and mixtures thereof.

7. The method of claim 6, wherein said barrier means further comprises at least one volatile material which volatizes upon heating and at a temperature below the melting point of said oxidation reaction product to render said barrier means permeable to said vapor-phase oxidant.

8. The method of claim 6, wherein said barrier means comprises at least one filler material.

9. The method of claim 8, wherein said barrier means comprises at least one particulate filler material mixed with said barrier means, said particulate filler material having substantially the same coefficient of expansion as that of the filler material or preform embedded within the ceramic matrix.

10. The method of claim 8 wherein said barrier means comprises a filler material which comprises alumina.

11. The method of claims 1, 2 or 3, wherein said barrier means comprises calcium sulfate and at least one material selected from the group consisting of silica and calcium carbonate.

12. The method of claims 1, 2 or 3, wherein said parent metal comprises aluminum.

13. The method of claims 1, 2 or 3, wherein said barrier means comprises at least one of stainless steel or dense ceramic.

14. The method of claims 1, 2 or 3, wherein said parent metal comprises a metal selected from the group consisting of silicon, titanium, tin, zirconium and hafnium.

15. The method of claims 2 or 3, wherein said oxidant comprises at least one material selected from the group consisting of a solid oxidant, a liquid oxidant and a combination of a solid oxidant and a liquid oxidant, incorporated into said filler material or said preform.

16. The method of claim 15, wherein said solid oxidant comprises an oxidant selected from the group consisting of silica, boron and reducible borides.

17. The method of claims 1, 2 or 3, wherein said vapor-phase oxidant comprises an oxidant selected from the group consisting of an oxygen-containing gas, a nitrogen-containing gas, a halogen, sulphur, phosphorus, arsenic, carbon, boron, selenium, and mixtures thereof.

18. The method of claim 17, wherein said oxidant comprises air.

19. The method of claim 17, wherein said oxidant comprises forming gas.

20. The method of claim 2 or claim 3, wherein said filler material or said preform comprises a material selected from the group consisting of hollow bodies, particulates, fibers, whiskers, steelwool, plates, bars, pellets, tubes, refractory fiber cloth, and mixtures thereof.

21. The method of claim 2 or claim 3, wherein said filler material or said preform comprises a material selected from the group consisting of at least one single metal oxide of a metal selected from the group consisting of aluminum, cerium, hafnium, lanthanum, neodymium, praseodymium, samarium, scandium, thorium, uranium, yttrium and zirconium.

22. The method of claim 2 or claim 3, wherein said filler material or said preform comprises a material selected from the group consisting of at least one of aluminum oxide, silicon carbide, silicon aluminum oxynitride, zirconium oxide, barium titanate, boron nitride, silicon nitride, magnesium aluminate, iron-chromium-aluminum alloy, aluminum, and mixtures thereof.

23. The method of claim 3, wherein said preform comprises at least one material selected from the group consisting of silica, silicon carbide, and alumina.

24. The method of claim 23, wherein said at least one material comprises particles of from about 10 mesh to about 1000 mesh.

25. The method of claim 3, wherein said preform comprises coated carbon fiber.

26. The method of claim 25, wherein said carbon fiber is coated with alumina.

27. The method of claims 1, 2 or 3, further comprising using a source of at least one dopant in conjunction with said parent metal.

28. The method of claim 27, wherein said at least one dopant is alloyed into the parent metal.

29. The method of claim 27, wherein at least one of said dopant sources are applied as a layer onto a surface of said parent metal, and further comprising forming the oxidation reaction product to substantially beyond the depth of the applied layer of dopant source.

30. The method of claim 27, wherein said at least one dopant source is provided at least partially within said filler material or said preform.

31. The method of claim 27, wherein said dopant source comprises a source of at least two selected from the group consisting of magnesium, zinc, silicon, germanium, tin, lead, boron, sodium, lithium, calcium, phosphorus, and yttrium.

32. The method of claim 31, wherein said polycrystalline material further comprises an initiation surface of a spinel formed as an oxidation reaction product of said parent metal, said dopant source, and said oxidant.

33. The method of claim 32, wherein said dopant comprises magnesium or a source of magnesium and said parent metal comprises aluminum.

34. The method of claim 27, wherein said parent metal comprises aluminum and further comprising at least one dopant source alloyed with said parent metal and at least one dopant source applied to the surface of said parent metal.

35. The method of claims 1, 2, or 3, wherein said parent metal comprises aluminum used in conjunction with a source of dopant, said oxidant comprises air, said heating step is between 850° C. and 1450° C., and said oxidant reaction product comprises alumina.

36. The method of claims, 1, 2, or 3, wherein said vapor-phase oxidant comprises an oxidant selected from the group consisting of an $H_2H_2O$ mixture, methane, ethane, propane, acetylene, ethylene, propylene, silica, a $CO/CO_2$ mixture, and mixtures thereof.

37. The method of claim 2 or claim 3, wherein said filler material or said preform comprises a material selected from the group consisting of powders, spheres, bubbles, wires, rods, platelets, tubules, and mixtures thereof.

38. The method of claim 31, wherein said dopant source further comprises a source of at least one rare earth metal.

39. The method of claim 27, wherein said dopant source further comprises a source of at least two selected from the group consisting of magnesium, zinc, silicon, germanium, tin, lead, boron, sodium, lithium, calcium, phosphorus and a rare earth metal.

40. The method of claim 39, wherein said at least one rare earth metal is selected from the group consisting of lanthanum, cerium, praseodymium, neodymium, and samarium.

41. The method of claims 1, 2 or 3, wherein at least a portion of said barrier means is permeable to said vapor-phase oxidant.

42. The methods of claims 1, 2 or 3, wherein said barrier means dissolves into and dilutes said molten parent metal upon contact with said molten parent metal to inhibit further growth of said oxidation reaction product.

43. The method of claims 1, 2 or 3, wherein said oxidation reaction product comprises a material selected from the group consisting of a parent metal oxide, parent metal nitride, parent metal boride, and parent metal carbide.

44. The method of claims 1, 2 or 3, wherein said barrier means comprises at least one material selected from the group consisting of a dense alumina ceramic or zirconia ceramic.

45. The method of claim 3, wherein said preform and said parent metal are combined as an assembly and said assembly is provided with said barrier means on all surfaces exposed to said vapor-phase oxidant.

46. A method of using a barrier means, said barrier means comprising at least one material which terminates or inhibits growth of an oxidation reaction product of a molten parent metal with at least one oxidant, including a vapor-phase oxidant, said method comprising the steps of: (a) orienting said barrier means with respect to a body of parent metal such that there is a space between said body of parent metal and said barrier means; (b) reacting said body of parent metal at a temperature above the melting point of said parent metal but below the melting point of said oxidation reaction product to grow a body of said oxidation reaction product into said space and into contact with said barrier means to terminate or inhibit further growth of said oxidation reaction product.

47. The method of claim 46, further comprising at least partially filling said space between said body of parent metal and said barrier means with at least one filler material, and growing said oxidation reaction product into and through said filler material and into contact with said barrier means to terminate or inhibit further growth of said oxidation reaction product.

48. The method of claim 47, wherein said filler material comprises at least one shaped, self-supporting preform.

49. The method of claim 9, wherein said barrier means comprises a filler material which comprises alumina.

* * * * *

UNITED STATES PATENT AND TRADEMARK OFFICE
CERTIFICATE OF CORRECTION

PATENT NO. : 4,923,832

DATED : May 8, 1990

INVENTOR(S) : Marc S. Newkirk et al.

It is certified that error appears in the above-indentified patent and that said Letters Patent is hereby corrected as shown below:

On the cover page under item [57] entitled "ABSTRACT"

| | |
|---|---|
| line 23: | change "and" to --an--. |
| line 29: | after "means" insert --onto--. |
| line 30: | change "such as a preform to" --or a self-supporting preform--. |
| Column 1, line 37: | after "example" insert a comma. |
| Column 1, line 42: | after "particulates" insert a comma. |
| Column 1, line 64: | change "Parent" to --parent--. |
| Column 2, line 21: | change "name" to --names--. |
| Column 2, line 55: | after "produce" insert --a--. |
| Column 10, line 7: | change "u-alumina" to --a-alumina--. |
| Column 11, line 18: | change "Parent" to --parent--. |
| Column 17, line 60: | change "A" to --As illustrated in Figure 5, a--. |
| Column 17, line 64: | change "was" to --of--; delete the comma after "FIG. 4". |
| Column 18, line 6: | after "FIG. 6" insert a comma. |
| Column 19, line 62: | after "drying" insert a period; change "the" to --The--. |
| Column 23, line 7: | delete "barrier". |
| Column 23, line 8: | change "and the thus forming a" to --thus forming a barrier and the barrier--. |
| Column 24, line 15: | change "snowed" to --showed--. |
| Column 24, line 19: | "barrier. (See Fig. 14.)" to --barrier,(See Fig. 14)-- |
| Column 24, line 46: | change "and" (second occurrence) to --before being--. |

UNITED STATES PATENT AND TRADEMARK OFFICE
CERTIFICATE OF CORRECTION

PATENT NO. : 4,923,832

DATED : May 8, 1990

INVENTOR(S) : Marc S. Newkirk et al.

It is certified that error appears in the above-indentified patent and that said Letters Patent is hereby corrected as shown below:

Column 24, line 47:     delete "then".

comma.
Column 26, line 42:     after "8" insert a comma.

Signed and Sealed this

Twenty-third Day of May, 1995

Attest:

BRUCE LEHMAN

Attesting Officer     Commissioner of Patents and Trademarks